Oct. 14, 1941.　　　E. A. MEYER ET AL　　　2,258,788

REVEAL MOLDING CLIP

Filed Aug. 23, 1940

Inventors
Engelbert A. Meyer &
Bart Cotter
By
Blackmore, Spencer & Flint
Attorneys Patented Oct. 14, 1941

2,258,788

UNITED STATES PATENT OFFICE 2,258,788

REVEAL MOLDING CLIP

Engelbert A. Meyer and Bart Cotter, Detroit, Mich., assignors to General Motors Corporation, Detroit, Mich., a corporation of Delaware Application August 23, 1940, Serial No. 353,836

7 Claims. (Cl. 24—73)

This invention relates to clips or securing devices and has particular reference to a clip or securing device to hold a molding in place on an automobile body.

The essential novelty of the invention resides in the provision of two semi-bulbous retaining elements, and in providing a head with shoulders to limit the extent to which the bulbous elements may project into an opening in the body. The head is further provided with two resilient wing portions which grip the sides of the molding to hold it in place.

Figure 1:
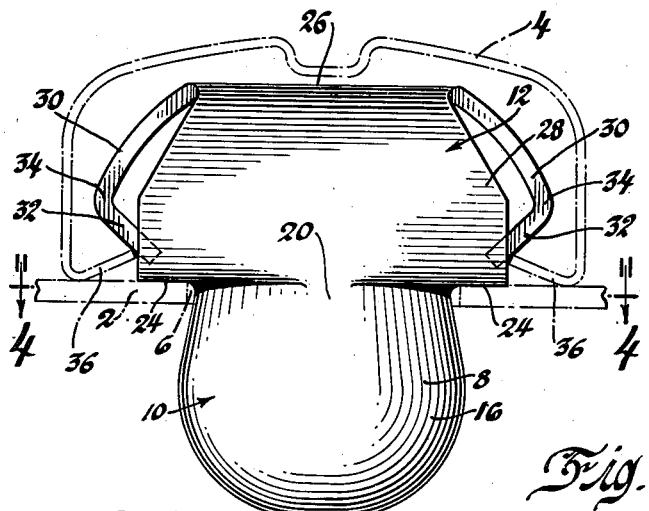
Figure 1 is an enlarged view of the clip showing a part of the automobile body and the molding in dotted outline.
Figure 2:
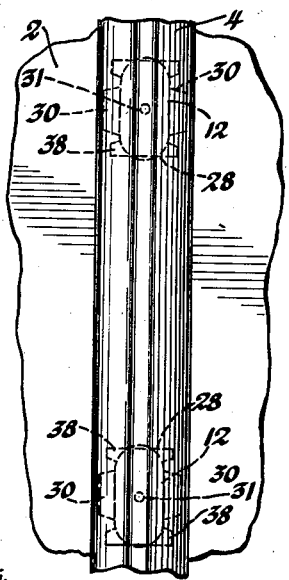
Figure 2 is a plan view of the structure of Figure 1 on a smaller scale.
Figure 3:
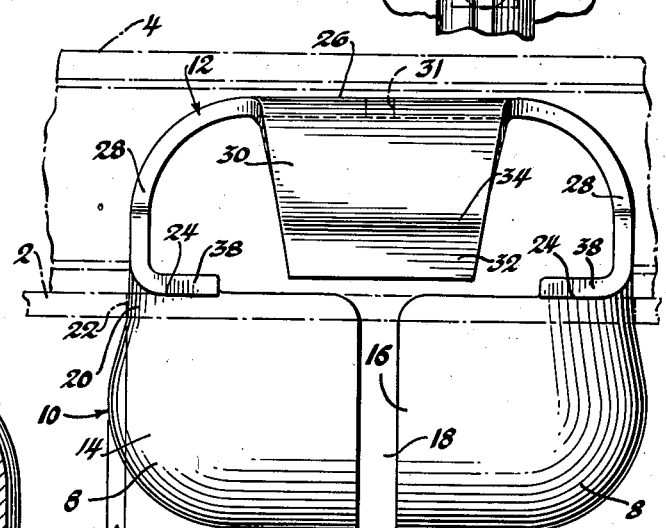
Figure 3 is a side view of the structure of Figure 1.

Referring to the drawing, the numeral 2 indicates any panel or surface, such as the side of an automobile body, to which a molding 4 is to be applied. Underneath the molding 4 the automobile body is provided with a plurality of openings 6, and in each opening 6 there is adapted to extend the securing portion or part 8 of the clip indicated as a whole at 10. The clip has the head portion or part indicated as a whole at 12.

The securing portion 10 comprises the two semi-bulbous members 14 and 16, the hollow parts of which face toward each other while the rounded or bulbous parts face away from each other. The members 14 and 16 are spaced apart as indicated at 18 and the top of each bulbous part 14 or 16 has a neck part 20 which is adapted to engage closely and tightly with the edge 22 of the opening 6. The width of the space at 18 is twice the width of the distance indicated at A, between the outermost part of the bulb 14 or 16 and the place 22 where the neck of the clip touches the opening 6. When the clip 10 is forced into the opening 6, the bulbous parts 14 and 16 will spring toward each other to enable the securing part 8 to pass through the opening. The clip will be pressed into the opening until the flat part 24 of the head abuts against the surface of the panel 2. The necks 20 will then be in engagement with the edge of the opening and the tendency of the bulbous parts 14 and 16 to spring apart will tightly hold the clip in the opening.

The head 12 is integral with the bulbous parts 14 and 16. In other words, the clip is formed of a single piece of metal which is bent upon itself. The bulbous parts 14 and 16 form the free ends of the clip. The head comprises the upper flat part 26, the sids 28, and the resilient wings 30. The part 26 is provided with an opening 31 to serve as a means to fill the pocket or the interior of the clip with a plastic to make a water-tight connection. The wings are positioned substantially at right angles to the sides 28. The wings have their ends 32 inturned as is best shown in Figure 1. An angle 34 is formed in the wings by the inturned part 32, and the inturned part projects into the space between the sides 28. When the molding 4 is applied to the clip, the ends 32 of the wings 30 are under compression and tend to press outwardly against the angularly bent edge 36 of the molding 4 tightly to hold the molding in place.

The flats 24 are on lateral extensions 38 of the side faces 28 and when the clip is applied the bulbous parts 14 and 16 can extend into the opening 6 no further than is permitted by the flats 24 on extensions 38.

Figure 4:
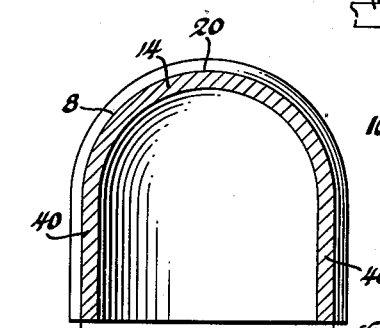
Figure 4 is a section on the line 4—4 of Figure 1.

As is seen in Figure 4, the sides 40 and 42 on each side of the semi-bulbs 14 and 16 are in the same planes.

In operation or use the clips are first applied to the body 2 by causing the bulbous parts 14 and 16 to be received in the openings 6. A suitable gun is then used to apply a plastic filler through the openings 31 into the pocket formed by the bulbous parts. The molding is then aligned over the clips in position. Pressure is now applied to the outer side of the molding to force the molding over the wings 30.

Figure 5:
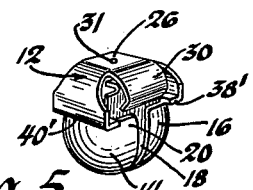
Figure 5 is a perspective view of a modified form of clip.

In Figure 5 a modification of the invention is shown. The essential difference resides in the position of the lateral extensions 38'. In Figure 5 these extensions project beyond the neck 20 a substantial distance and form a definite shoulder 40' between the neck 20 and the head 12.

We claim:

1. In a clip to secure a molding in place on an object, a head part and a securing part, said securing part comprising two semi-bulbous members extending beyond the full length of the clip and adapted to enter an opening in the object and be tightly retained in place at the edge of the opening around the entire periphery of the bulbous members, and means on the head to retain a molding strip.

2. In a clip to secure a molding in place on an object, a head part and a securing part, said securing part comprising two semi-bulbous members extending beyond the full length of the clip and adapted to enter an opening in the object and be tightly retained in place at the edge of the opening around the entire periphery of the bulbous members, a flat on the head adapted to engage with the surface of the object to limit the distance to which the bulbous members can enter the opening, and means on the head to retain a molding strip.

3. In a clip to secure a molding in place on an object, said clip comprising a single piece of metal bent intermediate its ends and formed into a head part and a securing part, a flat on the head part where it adjoins the securing part, said securing part comprising two bulbous members positioned adjacent each other and having the rounded part of the bulbs facing away from each other, said bulbous members extending beyond the full length of the clip and adapted to extend through an opening and be tightly retained therein by the edge of the opening around the entire periphery of the bulbous members the flat on the head limiting the inward movement of the clip into the opening.

4. In a clip to secure a molding in place on an object, a head part and a securing part, said securing part comprising two semi-bulbous members extending beyond the full length of the clip and adapted to enter an opening in the object and be tightly retained in place on the edge of the opening around the entire periphery of the bulbous members, means on the head to retain a molding strip, lateral wings on the head, means on the wings to engage the sides of the molding to retain the molding in place.

5. In a clip to secure a molding in place on an object, a head part and a securing part, said securing part comprising two semi-bulbous members extending beyond the full length of the clip and adapted to enter an opening in the object and be tightly retained in place on the edge of the opening around the entire periphery of the bulbous members, means on the head to retain a molding strip, said bulbous members being spaced from each other and adapted to move toward each other to enable the bulbous parts to be inserted into an opening smaller than the overall distance between the rounded sides of the bulbous member.

6. In a clip to secure a molding in place on an object, a head part adapted to hold a molding, a securing part adapted to be closely received by and held in an opening in the object, said securing part forming a pocket when in its position of use, and means in the head part to enable the application of a plastic to fill the pocket to form a water-tight connection.

7. In a clip to secure a molding in place on an object, a head part and a securing part, said securing part comprising two semi-bulbous members extending beyond the full length of the clip and adapted to enter an opening in the object and be tightly retained in place on the edge of the opening around the entire periphery of the bulbous members, means on the head to retain a molding strip, lateral wings on the head, means on the wings to engage the sides of the molding to retain the molding in place, and means in the head to enable a plastic filler to be supplied to the inside of the clip to fill the same to form a watertight seal.

ENGELBERT A. MEYER.
BART COTTER.